July 13, 1937.　　　　L. F. CARTER　　　　2,086,898

AIR BORNE DIRECTIONAL GYROSCOPE

Filed May 31, 1935　　　3 Sheets-Sheet 1

INVENTOR
Leslie F. Carter
BY
Herbert H. Thompson
HIS ATTORNEY.

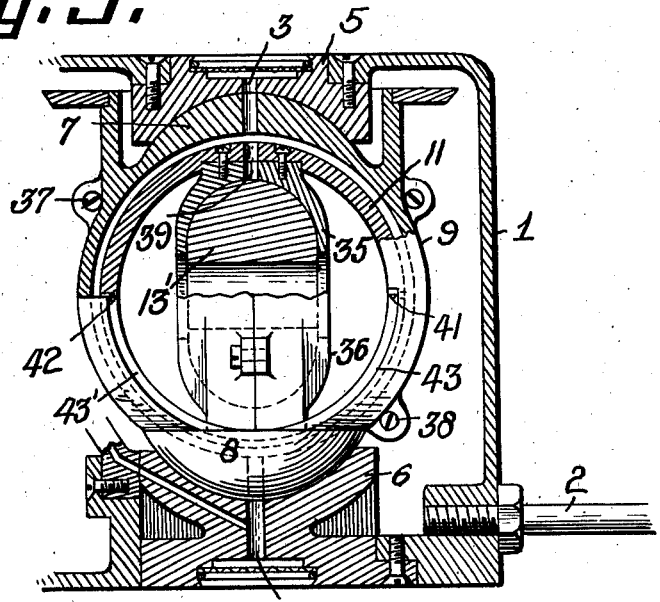
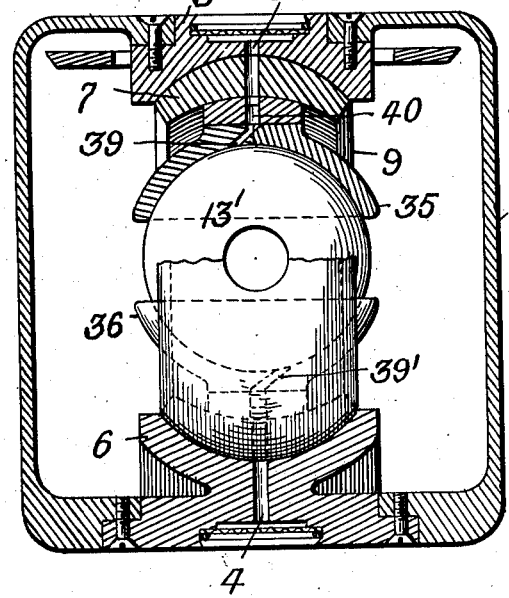
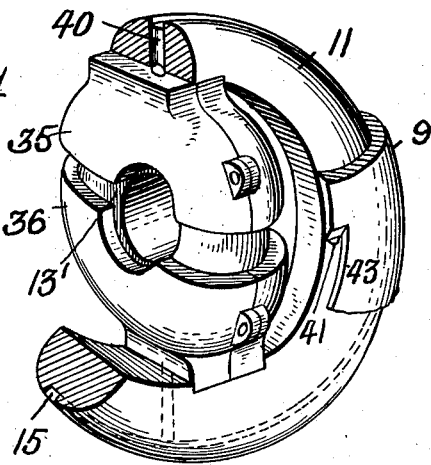

July 13, 1937.    L. F. CARTER    2,086,898
AIR BORNE DIRECTIONAL GYROSCOPE
Filed May 31, 1935    3 Sheets-Sheet 3

INVENTOR
Leslie F. Carter
BY Herbert H. Thompson
HIS ATTORNEY.

Patented July 13, 1937

2,086,898

UNITED STATES PATENT OFFICE 2,086,898

AIR BORNE DIRECTIONAL GYROSCOPE

Leslie F. Carter, Leonia, N. J., assignor to Sperry Gyroscope Company, Inc., Brooklyn, N. Y., a corporation of New York Application May 31, 1935, Serial No. 24,340

14 Claims. (Cl. 33—204)

This invention relates to a novel method of supporting a gyroscope for freedom about its several axes. More particularly, it relates to air bearings for gyroscopes and to a novel design of free or directional gyroscope especially adapted to employ air bearings. My invention also has application to other types of direction indicating gyroscopes, such as a gyroscopic compass.

According to my invention, all ordinary oil or anti-friction bearings are eliminated about all axes of the gyroscope and are replaced by floating the sensitive element on thin films of flowing air which maintain all metallic parts out of contact and virtually suspend the system on air films about all axes.

Referring to the drawings illustrating several embodiments of my invention,

Fig. 3 is a vertical section, partly in elevation, of a similar gyroscope.

Fig. 4 is a vertical section taken at right angles to Fig. 3.

Fig. 5 is a perspective view of the sensitive element of Figs. 3 and 4.

Figure 1:
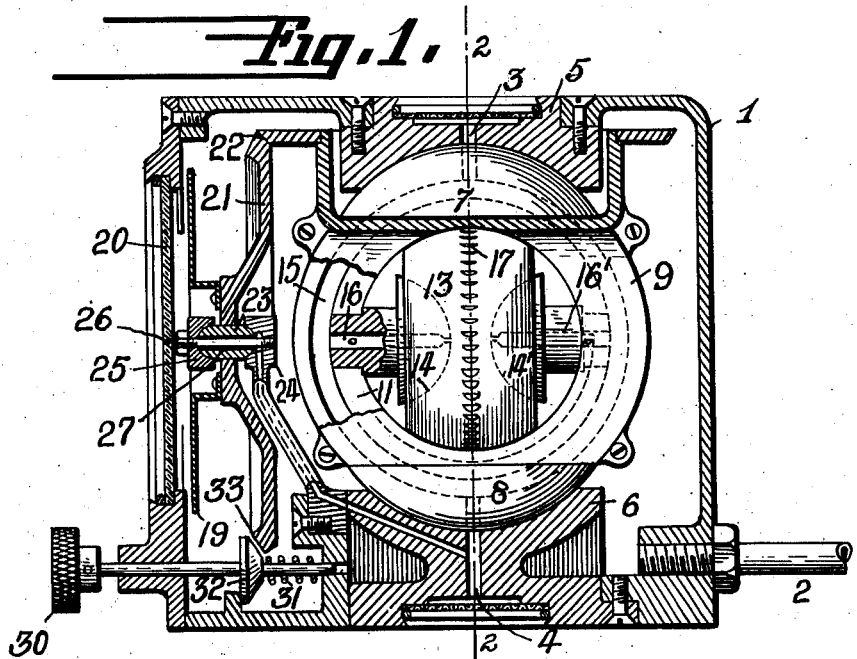
Fig. 1 is a side elevation, partly in section, of my invention as applied to a directional gyroscope.
Figure 2:
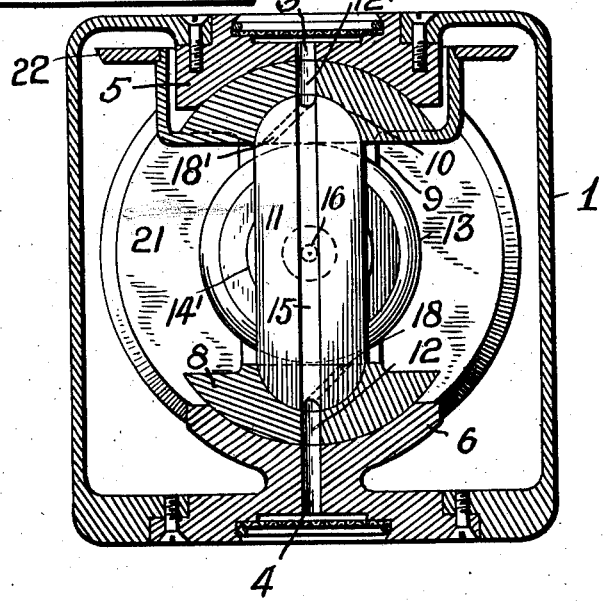
Fig. 2 is a vertical section of the same on line 2—2 of Fig. 1, looking in the direction of the arrow.

My invention is shown in Figs. 1 and 2 as applied to a directional gyroscope having freedom about the vertical and two horizontal axes, one of which is the axis of spin. Preferably the instrument is both air driven and air supported and a simple means of supplying air to all parts is by enclosing the instrument in an air tight casing 1, from which air is continuously exhausted through pipe 2 by a suitable vacuum pump (not shown). The casing is provided with one or more air inlets 3 and 4 at top and bottom, which may be screened against the entrance of dust. Freedom about the vertical axis is provided, in this instance, by cooperating buttons or spherical protuberances and sockets or cups on the sensitive element and the interior of the casing 1. As shown, upper and lower bearing blocks 5 and 6 are made cup shaped on their inner surfaces which receive spherical buttons 7 and 8 formed on a ring 9 which surrounds the gyroscope. A portion of the air passing through the openings 3 and 4 escapes outwardly between the cooperating cups and buttons and supplies an air film for each, floating the ring 9 and the parts supported by the same for freedom about the vertical axis. The center of curvature of the buttons is spaced so that the ring 9 can turn only about the vertical axis.

Ring 9 is provided on its inner periphery with a rounded channel 10 which surrounds a second ring 11 provided with a complementarily curved exterior surface which closely fits the channel in the ring, but between which is provided sufficient clearance for the escape of some of the air passing from the channels 3 and 4 into and through registering bores 12 and 12'. Thus the ring 11 is floated entirely around its periphery on an air film and gives the gyroscopic element freedom about the axis of the ring 11.

Within said ring is pivoted on a horizontal axis at right angles to the axis of the ring, the rotor element 13. In this case, the bearings are provided by means of inwardly projecting buttons 14 and 14' secured to the ring 11. Said ring is shown as having a channel 15 in the periphery thereof, which leads a portion of the air around the ring to registering bores 16 and 16' in said buttons. The air emerges from the centers of the buttons between the same and the corresponding cavities in the center of the rotor so as to float the same on a horizontal axis.

The rotor may be spun by one or more air jets, which in this instance engage the periphery of the rotor, on which small buckets 17 may be provided. In this instance the jets are shown as provided by obliquely directed holes 18 and 18' through the ring 11 and connecting the channel 15 with points adjacent the periphery of the rotor at top and bottom.

The indicating card 19, in this instance, is shown as of the vertical type read from the front of the casing through a glass window 20. Said card is shown as secured to a rotatably mounted member 21 which normally engages at its inner periphery the periphery of a ring 22 mounted on or secured to the ring 9. The drive between the parts 21 and 22 may be frictional or through small teeth. The part 21 is secured at its center to a small block 23 having rounded or hemispherical shaped ends, which is normally loosely clamped between a rear bearing block 24 and a forward bearing block 25, which are shown as tied together by a center bolt 26 passing through the block 23. A small quantity of air is supplied to both of these bearings through channel 27, the air floating block 23 at both ends, enough clearance being provided between the bolt 26 and the interior of the block 23 to provide a passage of air supply to the bearing 25. This clearance also permits a limited rocking of the member 21 in the plane of the paper in Fig. 1 to disengage the same from the beveled surface on 22. By this means the card may be reset without disturbing the gyroscope. For effecting this purpose, there is shown a knob 30 normally pressed outwardly by spring 31 and having a conical collar 32 thereon, normally disengaged from an outer beveled surface 33 on member 21. It will be evident that by pushing in on the knob and turning the same, the card may be reset and then dropped back into engagement with the gyroscopic element.

In Figs. 3, 4 and 5 the same general construction of the vertical ring 9 and the inner ring 11 is retained, but in this case a modified form of rotor bearing is provided. According to this modification, there is secured to the interior surface of the ring 11 at top and bottom, a pair of substantially semicircular cup-like members or half rings 35, 36, the interior of each of which has a substantially semicircular cross section to provide air bearings for the periphery of the rotor 13'. In this instance, the rotor is in the form of a ring without trunnions or other bearings at its center, being floated entirely around its periphery, but is free to turn only in the center plane of the ring.

It will be understood that in all cases the rings may be made split, if necessary for assembly purposes, and bolted together, as indicated, by bolts 37, 38, etc. passed through perforated ears on the two halves.

The air is shown as supplied for supporting and spinning the rotor through bores 39, 39' at top and bottom, registering with bores 40 through the ring 11. The bores 39, 39' are given a suitable inclination, as shown in Fig. 4, in order to spin as well as support the rotor, most of the air being used for spinning purposes, and the remainder escaping between the periphery of the rotor and the housing 35, 36 to float the rotor on air films. This form of gyroscope may be erected by a similar means to that employed in the other forms, namely, by opposite air ports 41' and 42' in the inner ring 11', which are oppositely covered and uncovered by knife edges 43' on the outer ring 9'. In this case, however, since the design prevents the placing of the jets on the horizontal axis of the gyroscope, I prefer to employ two pairs of jets 41, 41' and 42, 42' so that any reaction about the horizontal axis is balanced out by the fact that upon tilting, both ports of each pair are equally covered or uncovered.

In both forms of gyroscope illustrated, the gyroscope is erected or prevented from assuming a tilt by air jet means acting about the vertical axis in response to tilt. A convenient method of accomplishing this purpose is by providing small holes 41 and 42 which emerge horizontally from ring 11 on opposite sides of the vertical axis of said ring, and providing adjacent thereto cut-out portions 43 and 43' on the supporting ring 9. Normally, the jets on opposite sides of the gyroscope are equally uncovered, or preferably bisected, by the knife edge thus formed, but in case the ring 11 is relatively tilted by the tilt of the gyro axis, one of the jets is covered more than the other, resulting in an unbalanced torque about the vertical axis which causes immediate erection of the gyroscope by the shortest path.

Figure 6:
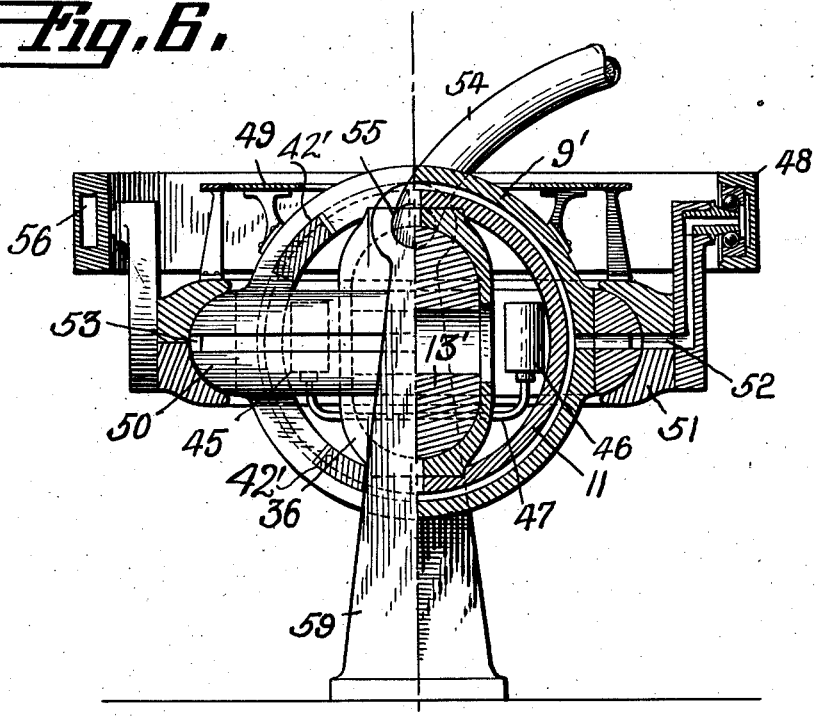
Fig. 6 is a side elevation, partly in section, of still another modified form of gyroscope, showing a different method of supporting the same for freedom about the vertical axis, and showing how my invention may be applied to a gyroscopic compass.
Figure 7:
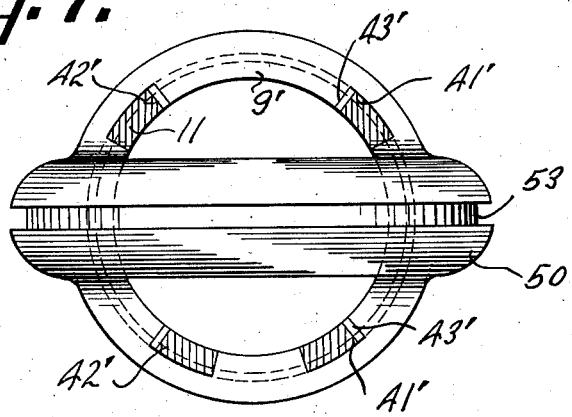
Fig. 7 is a side elevation of the outer and inner vertical rings of the form of the invention shown in Fig. 6.

In Fig. 6 is illustrated how my exterior or peripheral air flow bearing may be applied about all three axes of support of the gyroscope, Figs. 3 to 5 illustrating such type of bearing for providing freedom about the spin axis and about the horizontal axis perpendicular to the spin axis. In Fig. 6, therefore, the construction of Figs. 3 to 5 as to ring 11 and the rotor and rotor support may be retained. In this case, however, the outer ring 9' which surrounds ring 11 has no buttons at top and bottom, but is rigidly secured within an outer horizontal ring 50. This ring has a rounded periphery and is mounted, in turn, within an outer ring 51 so that the ring 50 is floated in air bearings about its vertical axis. Air is shown as supplied, as before, through bores 52 in the outer ring, part of the air emerging between the exterior surface of the ring 50 and the interior of ring 51 to float the former, the ring 50 being provided with an annular channel 53 which supplies air to the inner ring 9', as in the other forms.

It will be obvious that any one of the forms may be used either as directional gyroscope or as gyroscopic compass, according as to whether or not a gravitational control, such as a mercury box system, is provided. Thus, in Fig. 6, I have shown how my invention may be applied to a gyroscopic compass. By mounting mercury cups 45 and 46 on the ring 11 and connecting the cups by restricted tube 47, compass action may be secured, the air erecting device (not shown in this figure, but which may be the same as shown in Fig. 5) then acting as a damper. The whole instrument is then universally and pendulously mounted in a gimbal ring 48 pivoted on brackets 59. The compass card, in this instance, is shown as a ring 49 read from above. Air under pressure to support and drive the compass is shown as supplied through hose 54, which leads air in through the outer hollow trunnion 55 of gimbal 48, the air then passing through the hollow space 56 in the gimbal ring and through the hollow trunnions 56 on ring 51 into passages 52 referred to above.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I desire to claim and secure by Letters Patent is:

1. In a direction indicating gyroscope, an outer support, a ring, a curved exterior surface on said ring and a complementary curved surface on said support by which said ring is mounted for turning about a vertical axis within said support, a second ring within the first ring and coplanar therewith, said rings having interfitting exterior and interior curved surfaces by which said second ring is mounted for turning about a horizontal axis normal to the plane of said rings, means for supplying air flow between all of said surfaces to support the bearing surfaces on air films, and a rotor journalled within said second ring for spinning about an axis lying in the plane of said rings.

2. In a direction indicating gyroscope, an outer support, a ring, a curved exterior surface on said ring and a complementary curved surface on said support by which said ring is mounted for turning about a vertical axis within said support, a second ring within the first ring and coplanar therewith, said rings having interfitting exterior and interior curved surfaces by which said second ring is mounted for turning about a horizontal axis normal to the plane of said rings, a ring-like rotor within said second ring, said rotor and second ring having interfitting exterior and interior surfaces by which said rotor is mounted for spinning about a horizontal axis in the plane of said rings, and means for supplying continuous air flow between each pair of rings to provide air bearings about all three axes of freedom.

3. In a gyroscope, means for providing freedom about three perpendicular axes of support of said gyroscope, comprising peripheral air flow bearings between each of three successive pairs of interfitting coplanar rings for providing freedom about each of said axes, each pair of rings being perpendicular to the other two and the innermost ring constituting the rotor.

4. In a gyroscope, a ring-like rotor, an outer ring having a complementary curved inner periphery forming a bearing rotatably supporting said rotor, the centers of curvature of said rotor and ring in axial sectional planes being spaced, whereby said rotor is free to spin only in the plane of said outer ring, and means for supplying air to spin the rotor and to float the rotor within the ring in said bearing by air flow.

5. In a gyroscope, a ring-like rotor, a first ring having a complementary curved inner periphery forming a bearing rotatably supporting said rotor for spinning only in the plane of said first ring, means for supplying air to spin the rotor and to float the rotor within the ring by air flow, a second ring within which said first ring is fixed and lying perpendicular thereto, and a third ring surrounding said second ring and rotatably supporting the same around its periphery to form with said second ring an air flow bearing similar to said first bearing.

6. A direction indicating gyroscope in which the rotor is journalled for spinning about a normally horizontal axis and for freedom about a second horizontal axis and a vertical axis, in which freedom about all three axes is obtained by three successive pairs of interfitting rings, the rings of each respective pair being coplanar, the inner ring of the innermost pair constituting the rotor and lying in a vertical plane, and the second pair of rings lying in a second vertical plane normal to said first vertical plane, and the outer pair lying in a horizontal plane.

7. In a gyroscope, a ring-like rotor, an outer ring having a complementary curved inner periphery forming a bearing rotatably supporting said rotor for spinning only in the plane of said outer ring, means for supplying air to spin the rotor and to float the rotor within the ring by air films, a second ring within which said first ring is fixed and lying perpendicular thereto, a third ring surrounding said second ring and rotatably supporting the same around its periphery by a similar air flow bearing, means to form air jets emerging laterally from the second ring in opposite directions, and means on the third ring adapted to differentially intercept said jets upon relative tilt of said rings to apply a torque causing the rotor axis to return to normal position.

8. In a gyroscopic compass, a ring-like rotor, an outer ring having a complementary curved inner periphery forming a bearing rotatably supporting said rotor for spinning only in the plane of said outer ring, means for supplying air to spin the rotor and to float the rotor within the ring by air films, a second ring within which said first ring is fixed and lying in a plane perpendicular thereto, a third ring surrounding said second ring and rotatably supporting the same around its periphery by a similar air flow bearing, gravitationally responsive means secured to one of said rings, and means for mounting said third ring for freedom about a vertical axis.

9. In a gyroscopic compass, a ring-like rotor, a first ring having a complementary curved inner periphery forming a bearing rotatably supporting said rotor for spinning only in the plane of said outer ring, means for supplying air to spin the rotor and to float the rotor within the ring by air films, a second ring within which said first ring is fixed and lying in a plane perpendicular thereto, a third ring surrounding said second ring and rotatably supporting the same around its periphery by a similar air flow bearing, gravitationally responsive means secured to one of said rings, damping means responsive to relative tilt of said second and third rings, and means for mounting said third ring for freedom about a vertical axis.

10. In a directional gyroscope, an air borne vertical ring mounted for freedom about a vertical axis, a second ring within said vertical ring and coplanar therewith, said rings having interfitting curved outer and inner peripheries, respectively, means for supplying continuous air flow between said surfaces, one of said rings having laterally directed jets on opposite sides of said vertical axis and connected to said means, and a cut-off means for each of said jets on said other ring, whereby relative movement of said rings in the plane thereof away from their normal relative position causes said jets to apply an unbalanced torque about said vertical axis.

11. In an air borne directional gyroscope, an outer casing, a vertical ring, an air borne bearing having curvature in more than one plane between said ring and casing supporting the ring for turning about a vertical axis, a rotor bearing frame, an air borne bearing having curvature in more than one plane between said frame ring and frame supporting said frame for oscillation about a horizontal axis, oppositely directed discharge openings leading laterally from one part of said last named bearing, and a baffle means on the other part of said bearing to interrupt the air flow through one or the other of said openings on inclination of said frame about said horizontal axis.

12. In a direction indicating gyroscope, a rotor, a rotor bearing ring mounting said rotor for spinning about a normally horizontal axis, the ring lying in a plane containing said spin axis and parallel to the plane of the rotor, an outer ring surrounding said first ring lying coplanar therewith and providing a circumferential bearing rotatably supporting the same around its periphery, an outer casing, button and cup bearings between said casing and said outer ring supporting said ring with freedom about a vertical axis, means for supplying air flow between the surfaces of said bearings, laterally directed air jets in one of said rings, and intercepting means on the other of said rings for differentially intercepting said jets on relative tilt of said rings.

13. In an air borne directional gyroscope having a vertical ring, a vertical compass card normally turned by contact with a portion of said ring, an air bearing pivotally supporting said card on a horizontal axis, there being means for leading an air supply to said bearing, and means for tilting said card out of contact with said ring for resetting the same, said air bearing having sufficient clearance to permit such tilting, but the air flow normally maintaining the card vertical and in contact with the vertical ring.

14. An air borne gyroscope as claimed in claim 4, having an independently mounted vertical reading indicating card, also provided with an air flow bearing for pivotally mounting the same about a horizontal axis and having a driving connection with said ring.

LESLIE F. CARTER.